US008354952B2

(12) United States Patent
Dean (10) Patent No.: US 8,354,952 B2
(45) Date of Patent: Jan. 15, 2013

(54) SYSTEM AND METHOD FOR PHASE RETRIEVAL FOR RADIO TELESCOPE AND ANTENNA CONTROL

(75) Inventor: Bruce H. Dean, New Market, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 347 days.

(21) Appl. No.: 12/839,060

(22) Filed: Jul. 19, 2010

(65) Prior Publication Data

US 2012/0013502 A1     Jan. 19, 2012

(51) Int. Cl.
*G01S 13/86*     (2006.01)

(52) U.S. Cl. ............... 342/52; 342/53; 342/54; 342/55; 342/159; 342/174; 342/196; 356/124; 356/239.2; 382/260; 382/207

(58) Field of Classification Search ................ 342/25 R, 342/25 A–25 F, 52–55, 74, 159, 174, 190–192, 342/196; 356/124, 239.2; 382/260, 207
See application file for complete search history.

(56) References Cited

U.S. PATENT DOCUMENTS

| 3,719,127 | A | * | 3/1973 | Mueller | 365/119 |
|---|---|---|---|---|---|
| 4,971,409 | A | * | 11/1990 | Yeh et al. | 359/7 |
| 5,438,414 | A | * | 8/1995 | Rust | 356/364 |
| 5,910,839 | A | * | 6/1999 | Erskine | 356/497 |
| 5,969,334 | A | * | 10/1999 | Hutchin | 250/201.9 |
| 6,313,908 | B1 | * | 11/2001 | McGill et al. | 356/28.5 |
| 2003/0086624 | A1 | * | 5/2003 | Garcia | 382/275 |
| 2012/0013502 | A1 | * | 1/2012 | Dean | 342/25 D |
| 2012/0013965 | A1 | * | 1/2012 | Dean et al. | 359/239 |
| 2012/0014611 | A1 | * | 1/2012 | Dean | 382/207 |
| 2012/0014617 | A1 | * | 1/2012 | Dean | 382/260 |
| 2012/0050724 | A1 | * | 3/2012 | Dean et al. | 356/124 |
| 2012/0109559 | A1 | * | 5/2012 | Dean | 702/72 |

OTHER PUBLICATIONS

Hamidi, E.; Weiner, A.M.; , "Post-Compensation of Ultra-Wideband Antenna Dispersion Using Microwave Photonic Phase Filters and Its Applications to UWB Systems," Microwave Theory and Techniques, IEEE Transactions on , vol. 57, No. 4, pp. 890-898, Apr. 2009.*

* cited by examiner

*Primary Examiner* — John B Sotomayor (57) ABSTRACT

Disclosed herein are systems, methods, and non-transitory computer-readable storage media for radio phase retrieval. A system practicing the method gathers first data from radio waves associated with an object observed via a first aperture, gathers second data from radio waves associated with the object observed via an introduced second aperture associated with the first aperture, generates reduced noise data by incoherently subtracting the second data from the first data, and performs phase retrieval for the radio waves by modeling the reduced noise data using a single Fourier transform. The first and second apertures are at different positions, such as side by side. This approach can include determining a value Q which represents a ratio of wavelength times a focal ratio divided by pixel spacing. This information can be used to accurately measure and correct alignment errors or other optical system flaws in the apertures.

20 Claims, 7 Drawing Sheets

FIG. 7

SYSTEM AND METHOD FOR PHASE RETRIEVAL FOR RADIO TELESCOPE AND ANTENNA CONTROL

BACKGROUND

1. Technical Field

The present disclosure relates to phase retrieval and more specifically to radio telescope phase retrieval.

2. Introduction

Image-based wavefront sensing describes a general class of algorithms used to recover phase information from measured images of a defocused point source. Phase retrieval is a subset of this general class. Phase retrieval is a general term to describe the estimation of optical or radio system imperfections or aberrations. However, existing approaches do not approximate the incoherent subtraction process as a coherent propagation and are insufficiently accurate for some applications. What is needed in the art is an improved approach to general iterative-transform phase retrieval for application to radio telescope and antenna control.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For application to radio telescopes, such as the National Radio Astronomy Observatory (NRAO) Green Bank radio telescope, positive and negative data polarity feeds are incoherently subtracted to reduce noise in the measured data. Iterative-transform phase retrieval can be applied by approximating the incoherent subtraction process as a coherent propagation. The use of this image-based sensing system accurately measures surface and alignment errors of radio telescopes and antennas without the use of additional hardware or laser metrology. Accurate knowledge of the surface profile of the radio telescope or antenna allows a user or an automated system to correct such errors for a given surface temperature and observing angle. This phase retrieval image-based wavefront sensing approach can be applied to radio telescope and antenna control in the millimeter band (radio frequency bands having a wavelength from ten to one millimeter) and other high frequency bands.

Disclosed are systems, methods, and non-transitory computer-readable storage media for radio phase retrieval. A system practicing the method gathers first data from radio waves associated with an object observed via a first aperture, gathers second data from radio waves associated with the object observed via an introduced second aperture associated with the first aperture, generates reduced noise data by incoherently subtracting the second data from the first data, and performs phase retrieval for the radio waves by modeling, via a processor, the reduced noise data using a single Fourier transform. The introduced aperture can be a virtual or artificial aperture, or can be a separate camera or device from the device associated with the first aperture. The first and second apertures can be at different positions, such as side by side. In one aspect where space, bulk, and weight constraints are important such as space-based telescopes, one or both of the apertures can serve as a dual-purpose aperture. For example, the aperture can be a camera that switches between a first mode for gathering scientific data and a second mode for phase retrieval functions.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for performing phase retrieval of a radio telescope. Phase retrieval is an approach for determining the aberrations of a radio telescope or similar electromagnetic wave imaging system. A system, method and non-transitory computer-readable media are disclosed for performing phase retrieval, which gather first data from radio waves associated with an object observed via a first aperture, gather second data from radio waves associated with the object observed via an introduced second aperture associated with but different from the first aperture, generate reduced noise data by incoherently subtracting the second data from the first data, and perform phase retrieval for the radio waves by modeling, via a processor, the reduced noise data using a single Fourier transform.

For example, the first aperture can be a main telescope of a satellite based telescope. The second aperture can be a separate camera or telescope that may have a dual purpose. The second aperture can be aimed in accordance with the first aperture to capture an image of the same object. In another example of an array of small telescopes working together, the first aperture can be the entire array of small telescopes and the second aperture can be a subset of the small telescopes or a nearby, large telescope physically separate from the array of small telescopes.

Figure 1:
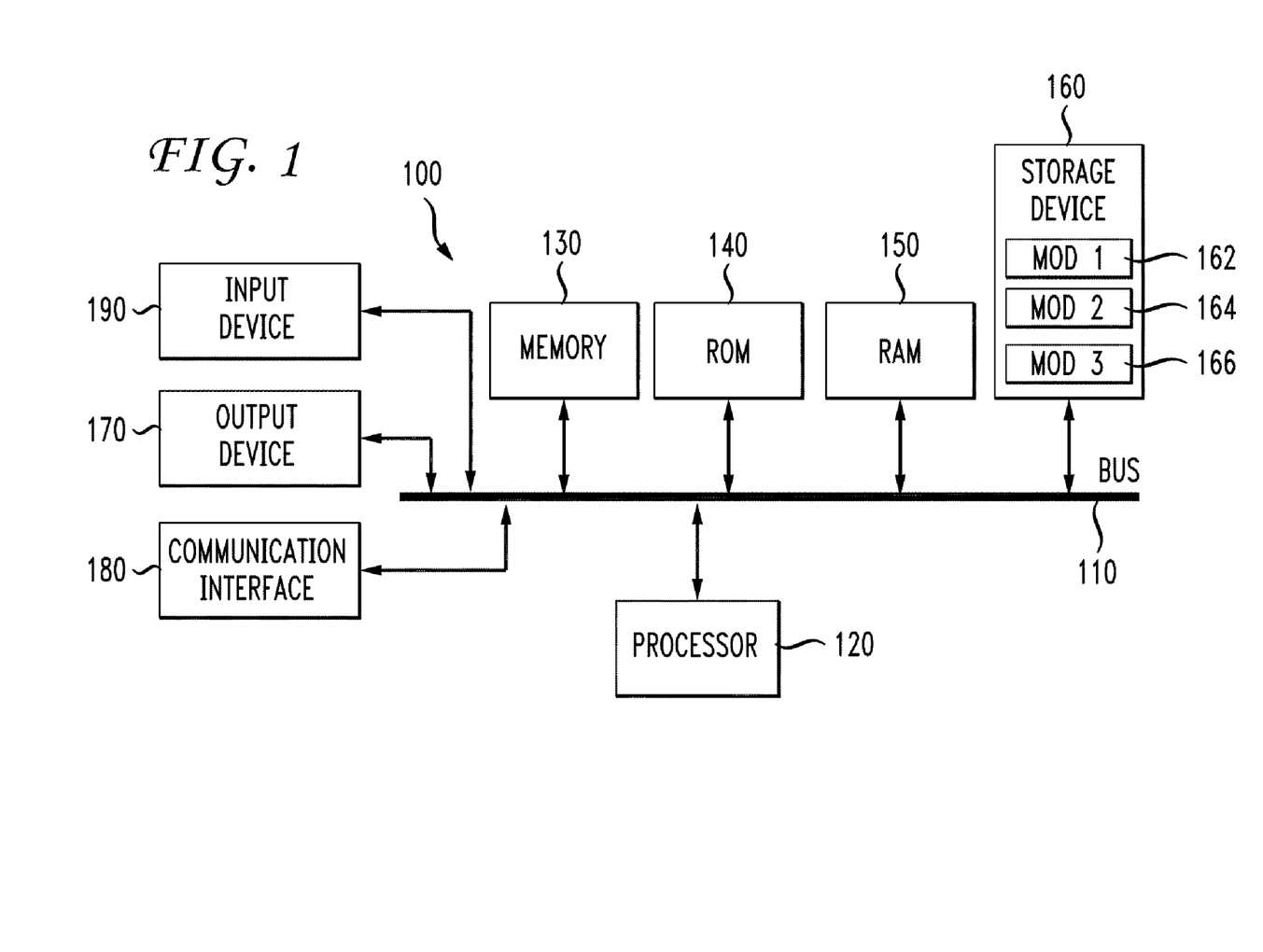
FIG. 1 illustrates an example system embodiment.
Figure 2:
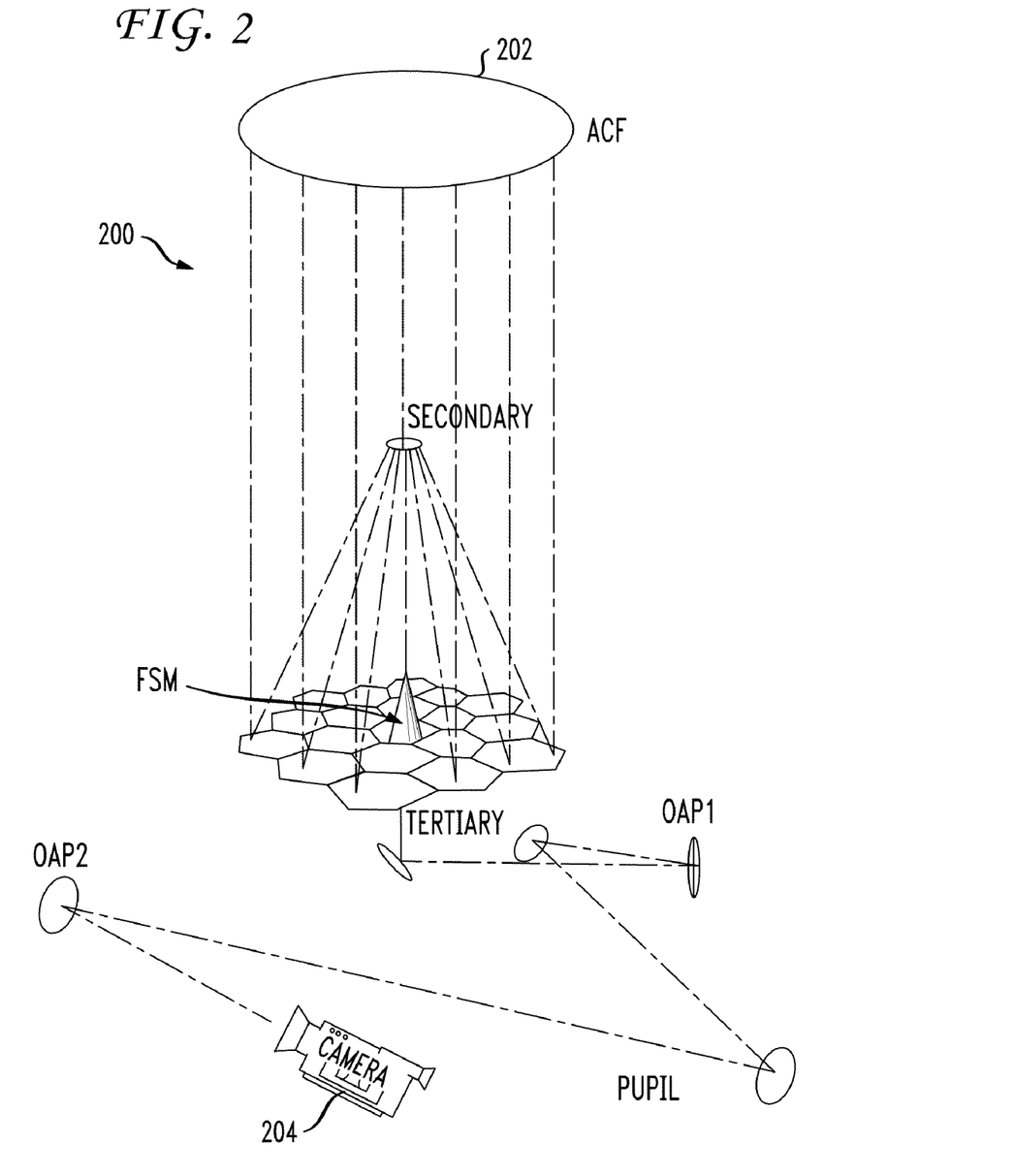
FIG. 2 illustrates an example radio telescope configuration.

A brief introductory description of a basic general purpose system or computing device in FIG. 1 which can be employed to practice the concepts is disclosed herein. After that, FIG. 2 illustrates an example radio telescope configuration having multiple elements. A more detailed description of methods and graphical interfaces will then follow. These and other variations shall be discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some basic computing system components, the disclosure now turns to an exemplary radio telescope configuration 200 as shown in FIG. 2. Broadly speaking, the exemplary telescope 200 receives electromagnetic waves at initial point 202. In this example the telescope 200 receives radio waves via an advanced coma-free telescope (ACF). The system configuration shown herein is exemplary and involves multiple elements. Other systems can include a larger or smaller number of elements in numerous other configurations, including arrays of discrete telescopes. In this example, the waves then reflect off an array of fine steering mirrors (FSMs) to a tertiary mirror, then to a series of off-axis parabola (OAP) mirrors, and through a pupil before the waves finally reach a camera 204. In the approach described herein, phase retrieval characterizes any aberrations, imperfections, and/or misalignments in the entire system based on an image received at the camera 204.

Phase retrieval includes analyzing images of point sources, such as stars, comets, or galaxies, collected by a camera system 204. Phase retrieval is particularly advantageous in space-based telescopes because a camera which is already a part of the system can serve a dual purpose as one of the two apertures. The camera can collect science data and switch into a diagnostic mode to gather images of point sources to perform phase retrieval and verify that the telescope is working as expected. This provides a compelling advantage over an interferometer-based approach which requires significant extra hardware. Phase retrieval is also applicable to radio telescope control. The difference is that the optical wavelengths of what is observed are different. However, some modifications can be applied to make the phase retrieval process more directly applicable to radio telescopes. For example with radio telescopes positive and negative polarity feeds are incoherently subtracted to reduce noise.

Figure 3:
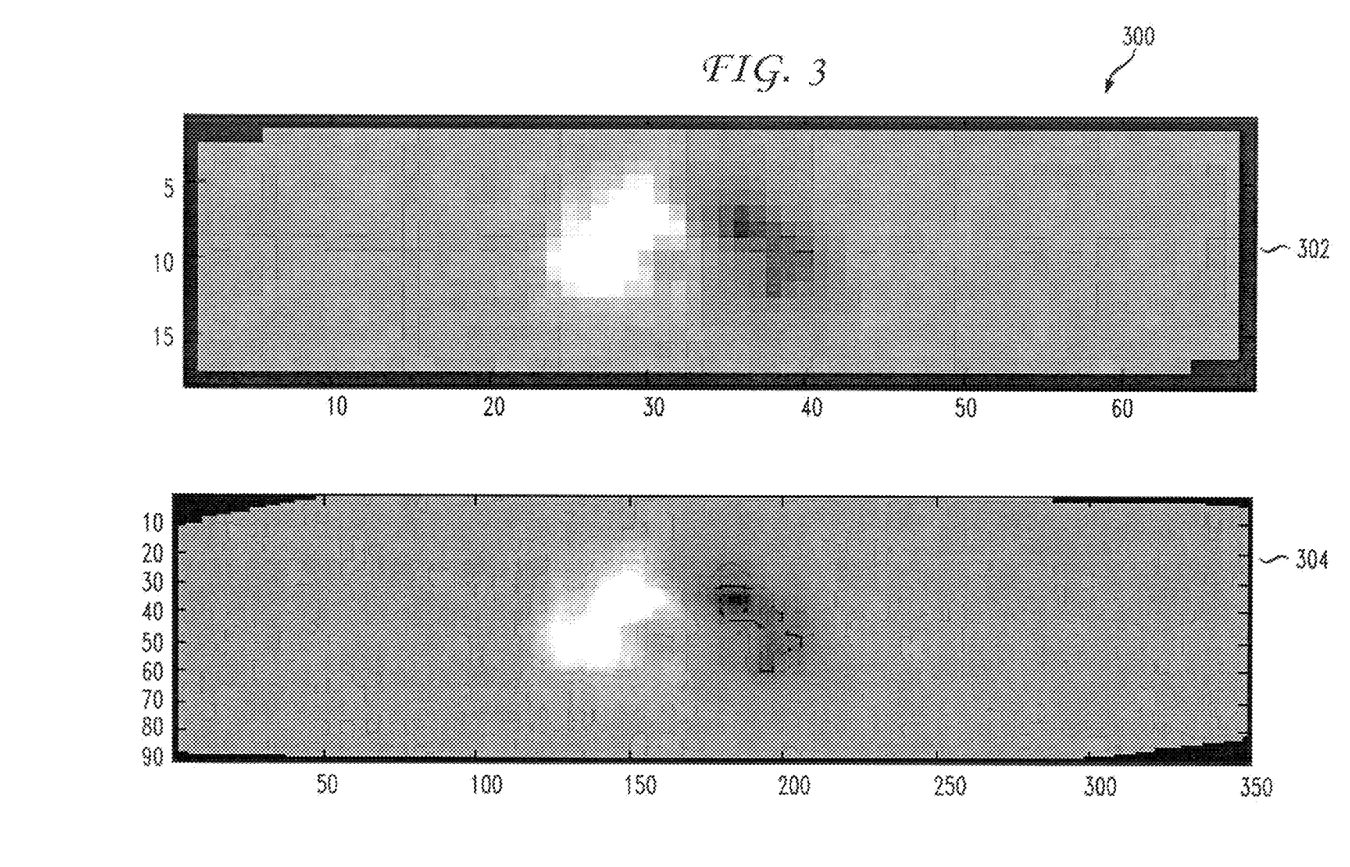
FIG. 3 illustrates an exemplary out-of-focus image of a quasar.

FIG. 3 illustrates an exemplary image 300 of a quasar. This is one example of what data looks like from a telescope. In this case, the data is an out of focus image of a quasar. Existing optical systems simply subtract a positive image and negative image from one another to help produce noise in the system, but that subtraction is done in an incoherent way. This image 300 includes top 302 and bottom 304 portions. The top portion 302 is a down-sample in x, and the bottom portion 304 is an up-sample in y. On the left is an elongated peanut shaped object and on the right is a darker object that looks like a mirror image of the left. These two images are combined together in one data set to reduce noise in the data by subtracting them in this fashion. The image data are subtracted but the subtraction occurs in a way that there is no refraction interference between these two images in the data.

Figure 4:
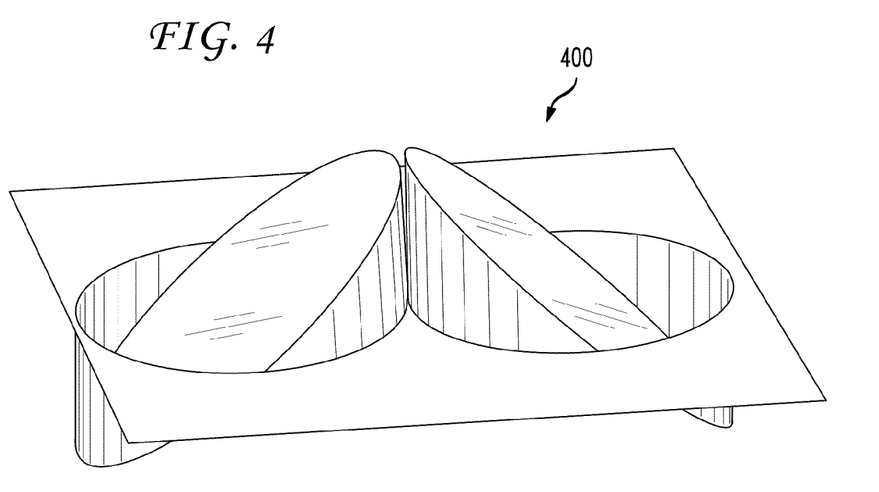
FIG. 4 illustrates an example of beam tilt.

The system can conveniently model this data using the Fourier transform of an aperture by allowing the images to coherently interfere as an approximation. For example, consider two apertures side by side capturing an image of the same object. The two apertures produce two images. The system can treat the aperture of the telescope as being comprised of two apertures at two different locations, such as side by side, several feet apart, or even further apart. In one variation, instead of one aperture, the system adds beam tilt 400 as shown in FIG. 4 to control how close together the resulting images are in a data model.

The data can be modeled as a Fourier transform. This data is unique to telescopes because telescopes can abstract two images which can be modeled as being composed of two apertures, one aperture being artificial. Introducing a second aperture introduces errors into the data, however the error rate can be kept acceptably small if the tilt in the apertures is large enough to reduce the interference artifacts. In one variation, the data is approximated using two apertures when only one aperture is used. If two beams interfere when they are close together, that amount of controlled error can be expected in making data approximations. The amount of error that is used in modeling this process using two apertures side by side, which is not real but an approximation, makes modeling the data for this application a lot easier. The approach set forth herein introduce an artificial aperture for an application where normally a user would not be able to apply phase retrieval. This approach is a new configuration for phase retrieval.

In addition to radio telescopes, other possible applications include subtracting two signals from one another, and using phase retrieval to characterize them. Thereby the system can introduce an artificial aperture so that a single Fourier transform can be used to model the data formed from two images subtracted from one another. The single Fourier transform can model a convenient approximation of the overlapping images when the images were not really formed that way.

Figure 6A:
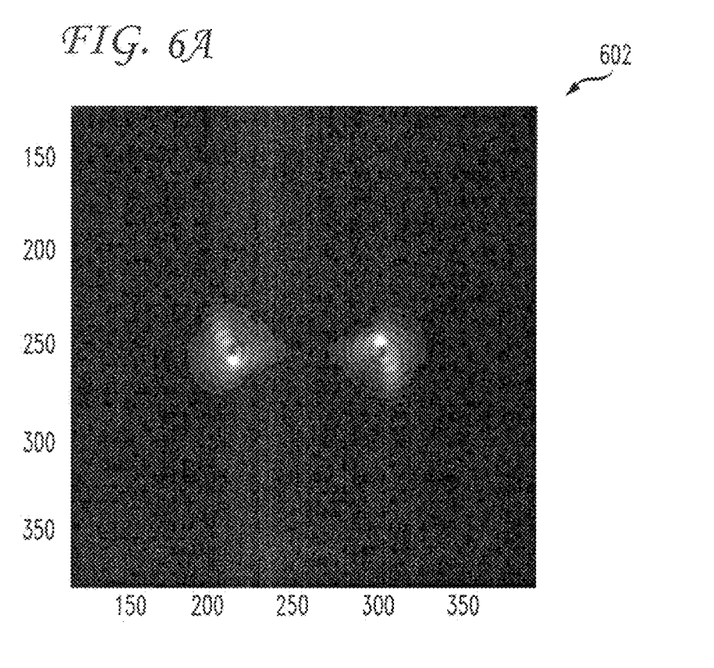
FIGS. 6A-6D illustrate sample images related to phase retrieval with the Fourier transform using two apertures to recover misalignments.
Figure 6B:
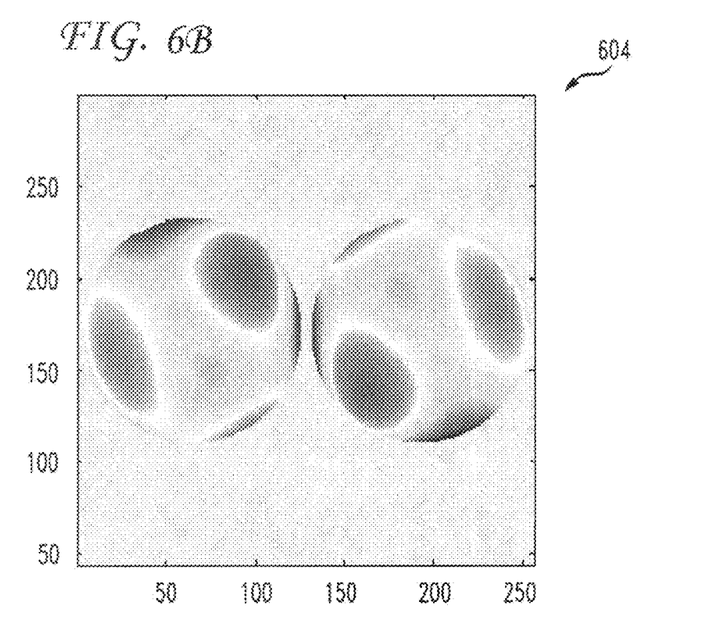
Figure 6C:
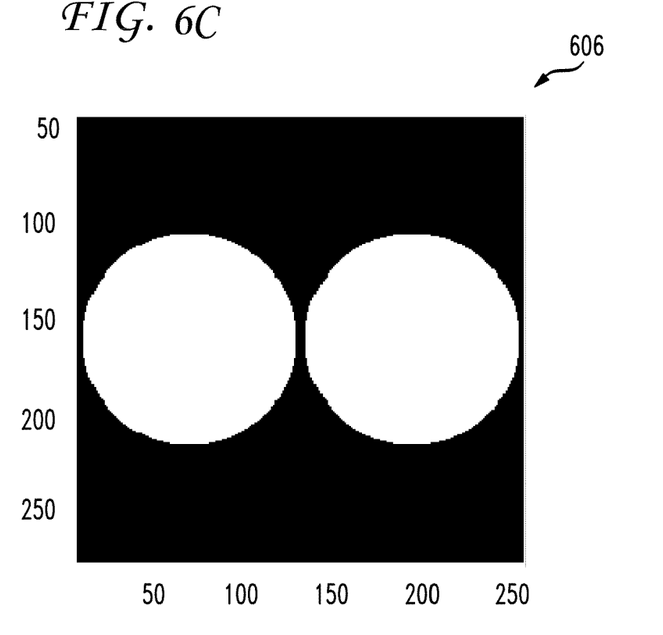
Figure 6D:
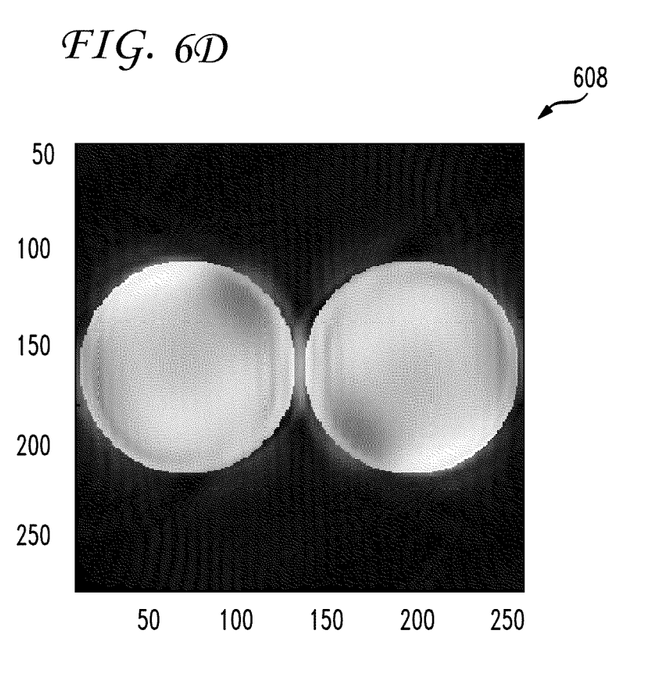

FIGS. 6A-D illustrates sample images related to phase retrieval with the Fourier transform using two apertures to recover misalignments. In phase retrieval, the Fourier transform process uses two apertures to recover misalignments and imperfections in the telescope or other system. For the degree of separation between the two images 602 in FIG. 6A and dual aperture model 604 in FIG. 6B the Fourier transform performs very well. The errors are so insignificant that the differences from the known input and the wavefronts retrieved are imperceptible. The left aperture and right aperture can be distinguished using left and right beams and labels having the shown pupil amplitude 606 in FIG. 6C, but essentially either one can be used for phase retrieval to determine what's wrong in the optical system. The recovered image 608 in FIG. 6D shows these aberrations and imperfections in the optical system.

Figure 5:
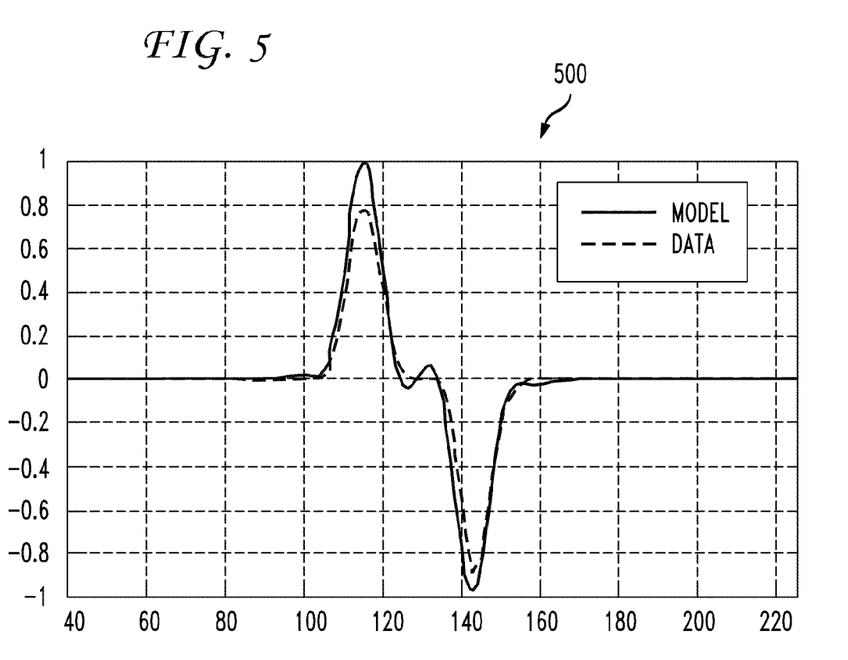
FIG. 5 illustrates a chart based on sample positive and negative polarity images.

Introducing an artificial aperture allows the system to use a single Fourier transform to model data that has been collected and incoherently subtracted to reduce noise in the data. This approach is based on an observation that the signals corrected by the telescope receiver by itself are often the difference of a positive signal and a negative signal in order to reduce noise in the data. This application subtracts positive and negative polarity images. FIG. 5 illustrates a chart 500 based on sample positive and negative polarity images. The left hump points up and the right hump points down. This chart 500 represents a cross section of the data from this application. The image is positive and negative. In order to model this data using phase retrieval, the system executes an algorithm. The first step of the algorithm is to model this data using positive and negative image with a Fourier transform of a single aperture, so the system relies on an introduced artificial aperture. In order to use a single Fourier transform two apertures are positioned side acknowledging that some error is introduced. However, the amount of error introduces is acceptably low for many applications. The system models the process as a single Fourier transform even though the data was not originally formed that way. When the data is modeled using this approximation, the calculation is much simpler.

Figure 7:
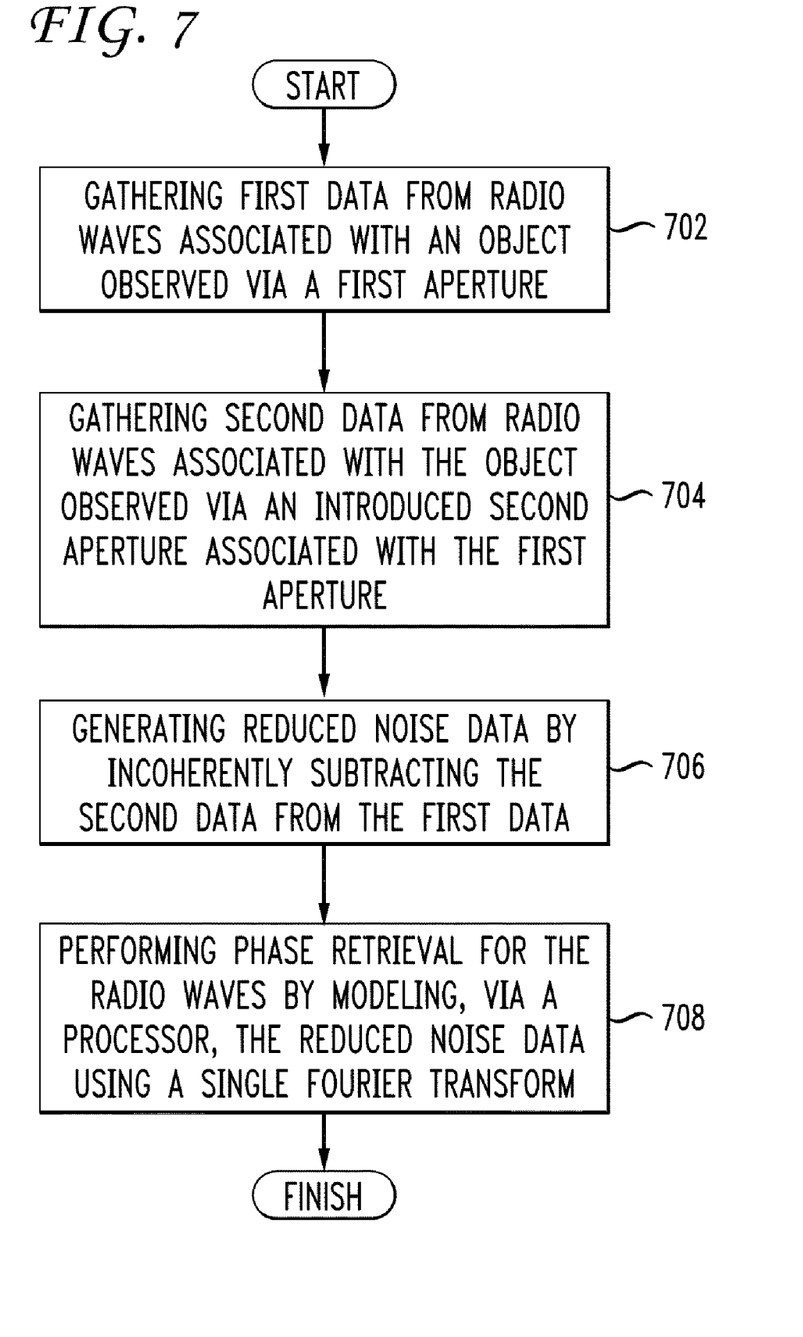
FIG. 7 illustrates an exemplary method embodiment.

FIG. 7 illustrates an exemplary method embodiment for radio phase retrieval. The system 100 gathers first data from radio waves associated with an object observed via a first aperture (702) and gathers second data from radio waves associated with the object observed via an introduced second aperture associated with the first aperture (704). In one variation, the first aperture and the second aperture are at different positions. The first data can represents a positive signal and the second data can represent a negative signal, or vice versa. One or both of the apertures can optionally include a beam tilt. The apertures can be associated with ratio telescope and antenna control in the millimeter wave frequency band, including wavelengths of approximately 1 to 10 millimeters. One of the apertures can be a dual-purpose camera that switches between a first mode for gathering scientific data and a second mode for phase retrieval diagnostics.

The system 100 generates reduced noise data by incoherently subtracting the second data from the first data (706) and performs phase retrieval for the radio waves by modeling, via a processor, the reduced noise data using a single Fourier transform (708). Modeling the reduced noise data can produce an approximation of the first data. Phase retrieval produces a value for a ratio Q which represents the ratio of wavelength times the focal ratio divided by pixel spacing. Phase retrieval can further approximate an incoherent subtraction process as a coherent propagation. The phase retrieval result can be used to measure alignment errors in the first aperture based on the phase retrieval and consequently can be used to correct the alignment errors. Alignment errors can be corrected further based on a given surface temperature and an observing angle.

Thus, a telescope and a second aperture can each take an image of an object, and the system can retrieve the phase of the telescope, which characterizes the flaws, aberrations, and imperfections of the telescope, from the two images. The retrieved phase can be used to adjust or align the telescope automatically or manually.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein are applicable to phase retrieval with any system that observes radio waves. Those skilled in the art will readily recognize various modifications and changes that may be made to the principles described herein without following the example embodiments and applications illustrated and described herein, and without departing from the spirit and scope of the disclosure.

I claim:

1. A method of radio phase retrieval, the method comprising:
    gathering first data from first radio waves associated with an object observed via a first aperture;
    gathering second data from second radio waves associated with the object observed via an introduced second aperture associated with the first aperture;
    generating reduced noise data by incoherently subtracting the second data from the first data; and
    performing phase retrieval for the radio waves by modeling, via a processor, the reduced noise data using a single Fourier transform.

2. The method of claim 1, wherein the first aperture and the second aperture are at different positions.

3. The method of claim 1, wherein modeling the reduced noise data produces an approximation of the first data.

4. The method of claim 1, wherein the first data represents a positive signal and the second data represents a negative signal.

5. The method of claim 1, wherein at least one of the first aperture and the second aperture includes a beam tilt.

6. The method of claim 1, wherein performing phase retrieval further comprises determining a ratio Q which represents a ratio of wavelength times a focal ratio divided by pixel spacing.

7. The method of claim 1, wherein the first aperture and the second aperture are associated with ratio telescope and antenna control in a millimeter-level wave band.

8. The method of claim 1, wherein performing phase retrieval further comprises approximating an incoherent subtraction process as a coherent propagation.

9. The method of claim 1, the method further comprising measuring alignment errors in the first aperture based on the phase retrieval.

10. The method of claim 9, the method further comprising correcting the alignment errors.

11. The method of claim 10, wherein correcting the alignment errors is further based on at least one of a given surface temperature and an observing angle.

12. The method of claim 1, wherein at least one of the first aperture and the second aperture is a dual-purpose camera that can switch between a first mode for gathering scientific data and a second mode for phase retrieval diagnostics.

13. A system for radio phase retrieval, the system comprising:
    a processor;
    a first module controlling the processor to gather first data from radio waves associated with an object observed via a first aperture;

a second module controlling the processor to gather second data from the radio waves associated with the object observed via an introduced second aperture associated with the first aperture;

a third module controlling the processor to generate reduced noise data by incoherently subtracting the second data from the first data; and a fourth module controlling the processor to perform phase retrieval for the radio waves by modeling, via a processor, the reduced noise data using a single Fourier transform.

14. The system of claim 13, wherein the first aperture and the second aperture are at different positions.

15. The system of claim 13, wherein modeling the reduced noise data produces an approximation of the first data.

16. The system of claim 13, wherein the first data represents a positive signal and the second data represents a negative signal.

17. A non-transitory computer-readable storage medium storing instructions which, when executed by a computing device, cause the computing device to perform radio phase retrieval, the instructions comprising:

gathering first data from radio waves associated with an object observed via a first aperture;

gathering second data from the radio waves associated with the object observed via an introduced second aperture associated with the first aperture;

generating reduced noise data by incoherently subtracting the second data from the first data; and performing phase retrieval for the radio waves by modeling, via a processor, the reduced noise data using a single Fourier transform.

18. The non-transitory computer-readable storage medium of claim 17, wherein performing phase retrieval further comprises determining a ratio Q which represents a ratio of wavelength times a focal ratio divided by pixel spacing.

19. The non-transitory computer-readable storage medium of claim 17, the method further comprising measuring alignment errors in the first aperture based on the phase retrieval.

20. The non-transitory computer-readable storage medium of claim 17, wherein at least one of the first aperture and the second aperture is a dual-purpose camera that can switch between a first mode for gathering scientific data and a second mode for phase retrieval diagnostics.

* * * * *